United States Patent [19]

Oppenheim et al.

[11] Patent Number: 4,926,818

[45] Date of Patent: May 22, 1990

[54] PULSED JET COMBUSTION GENERATOR FOR PREMIXED CHARGE ENGINES

[75] Inventors: A. K. Oppenheim, Berkeley; H. E. Stewart, Alameda; K. Hom, Hercules, all of Calif.

[73] Assignee: The Regents of the University of California, Oakland, Calif.

[21] Appl. No.: 315,405

[22] Filed: Feb. 24, 1989

[51] Int. Cl.[5] .......................... F02P 1/00; F02B 23/00

[52] U.S. Cl. .................................... 123/297; 123/266; 123/268

[58] Field of Search ............... 123/297, 266, 293, 298, 123/268

[56] References Cited

U.S. PATENT DOCUMENTS 4,303,045 12/1981 Austin, Jr. ........................... 123/266
4,361,122 11/1982 Latsch ................................ 123/266
4,416,228 11/1983 Benedikt et al. .................... 123/268

*Primary Examiner*—Raymond A. Nelli
*Attorney, Agent, or Firm*—Robert W. Mulcahy; Robert J. Henry; Berthhold J. Weis

[57] ABSTRACT

A method and device for generating pulsed jets which will form plumes comprising eddie structures, which will entrain a fuel/air mixture from the head space of an internal combustion engine, and mixing this fuel/air mixture with a pre-ignited fuel/air mixture of the plumes thereby causing combustion of the reactants to occur within the interior of the eddie structures.

12 Claims, 5 Drawing Sheets

32 31 28 18 13 22 19 17 21 12 27 20 24 25 23 26 11 14 15 9

PULSED JET COMBUSTION GENERATOR FOR PREMIXED CHARGE ENGINES

FIELD OF THE INVENTION

This invention relates to a method and apparatus for generating pulsed jets containing hot combustion products, that is gases of a sufficiently high temperature and appreciable concentration of active radicals to initiate ignition and sustain subsequent combustion of a relatively lean air/fuel mixture. When injected into a premixed charge medium in an internal combustion engine cylinder, such jets will form plumes which will entrain and ignite the premixed charge medium in the interior of the eddies of which such plumes consist.

The U.S. government has rights in this invention pursuant to Contract DE-AC03-76SF00098 between the U.S. Department of Energy and the University of California for the operation of Lawrence Berkeley Laboratory.

BACKGROUND OF THE INVENTION

This invention is related to copending patent application entitled "Method and System for Controlled Combustion Engines" by A. K. Oppenheim, which describes a general approach of achieving control over the combustion process in the cylinder of internal combustion engines, i.e., by generating a plurality of plumes where the reactants meet in the interior of the eddie structures of which these plumes consist, and are caused to react therein by some reaction initiating reagent. High temperature products of combustion, containing active radicals, are used in the case of premixed charge engines. Compression-heated air is used in the case of non-premixed charge engines where it is entrained into the eddies of pulsed jet plumes made out of relatively low temperature air carrying finely atomized fuel drops.

The present invention relates to a pulsed jet combustion generator, which is a device capable of furnishing the required plumes for internal combustion engines operating with premixed charge or Otto cycle type engines.

THE PRIOR ART

There are numerous modifications of spark plugs with chambers for igniting fuel-air mixtures disclosed in the literature, however, none are suitable for executing combustion in internal combustion engines as proposed in the above cited copending application by A. K. Oppenheim. Perhaps a fundamental reason is that the fluid dynamic concepts involved in the proposed method for controlling combustion were not understood or not accepted.

In particular, U.S. Pat. No. 4,006,725 to Baczek, discloses a spark plug exhibiting an interior chamber, which surrounds the electrodes forming a spark gap, and which receives a rich fuel air mixture from a rich fuel source. Upon ignition, the combustion products exit into the cylinder head space through parts in the spark plug walls. The principal disadvantage is that the way the reactants are introduced in the prechamber does not provide for their proper distribution to generate a jet of sufficient impulse, upon ignition in the prechamber to satisfy the requirements for formation of the plumes capable on entraining a sufficient amount of compressed charge contained in engine cylinder. Also the device is evidently meant for use in conjunction with carburetor engines, rather than the state-of-the-art computer governed, direct injection engines. Furthermore, the device is bulky, due to the lateral fuel feed arrangement, and does hence not lend itself to installation of multiple generators per cylinder, as required to execute combustion in accordance with the above-cited application.

U.S. Pat. Nos. 4,361,122; 4,416,228; 4,465,031; and 4,509,476, all assigned to Robert Bosch GMBH, disclose various modifications of a sparkplug with a preignition chamber, within which a fuel-air mixture is ignited by an electrical spark. Again the combustion products exit through a plurality of ports. However, a significant feature of the device is that the fuel-air mixture within the preignition chamber is obtained from the cylinder interior through the exit ports during the compression stroke. Therefore the device is not suitable for controlling and executing combustion as intended in out above cited application.

The thermo-chemical features of this invention are based on the same principles as those used by Semenov et al. and Goosak in U.S. Pat. Nos. 3,802,827; 3,230,933; 3,092,088 and 3,283,751. This was referred to as the LAG Process or Avalanche Activated Combustion and it was associated with jet injection of rich combustion products. However, their application to internal combustion engines was for three-valve engines (the third valve employed to admit the combustible mixture into the cavity of the jet generator), ruling out the use of a multiplicity of sequentially activated jet generators forming one of the salient features of the present device.

In summary, the major shortcoming of similar devices of the prior art is that they are not capable of furnishing the required plumes capable of entraining a sufficient amount of the compressed charge so that ignition and subsequent combustion occurs in the interior of the eddies of which the plumes consist, but essentially ignite the main charge by establishing too readily the conventional flame fronts which traverse the charge at their own normal burning speeds.

OBJECTS AND SUMMARY OF THE INVENTION

Accordingly, a primary object of the invention is to provide a device, capable of generating jets of high temperature gases including active radicals, which when injected into the head space of a cylinder containing a compressed medium of premixed reactants, forms a plume which entrains the reactants and cause them to burn within the eddies of which the plume consists.

Another object of the invention is to provide a plurality of pulsed jet combustion generators to form plumes which, upon expansion due to the exothermicity of combustion will eventually occupy the whole head space.

Yet another object of the invention is to provide a pulsed jet combustion generator whose physical size and shape is such that it will permit it to be installed into cylinder heads in groups of 2–8 using conventional spark plug ports.

Still another object of the invention is to provide a pulsed jet combustion generator which is compatible with state-of-the-art computerized and fuel injected premixed charge internal combustion engines.

A further object of the invention is to provide a pulsed jet combustion generator and associated system for independently varying the amounts of both fuel and air introduced into the prechamber, as well as the timing of their ignition, in response to and under the control of a microprocessor.

The above objects are achieved as follows:

In general, the present pulsed jet combustion PJC generator comprises structural means for providing a prechamber activity, means for introducing reactants in the appropriate quantities into the prechamber, means for igniting the reactants at a predetermined controlled time interval to generate a rapid rise in temperature and pressure within the prechamber, and one or more exit sharp edged orifices which will permit the reactant mixtures to be expelled at a minimum of interference with the non-equilibrium chemical composition of the mixture, in a desired direction within the head space of the cylinder. A critical aspect of the invention is to achieve the fluid dynamic conditions under which such plumes are formed. The parameters which control appropriate plume formation to cover a given fraction of cylinder volume with a given charge are: the volume of the chamber of the device, the quantity and chemical composition of reactants introduced into the chamber which govern the pressure rise achieved as a result of their ignition, and the cross-sectional area of the exit orifices. These parameters are chosen such that their combination will issue a jet which will form a plume of the desired volume and shape in the head space of the cylinder.

The volume of the prechamber may be the parameter chosen first, dictated by considerations of a convenient size of the device in relation to the engine or, more particularly, the cylinder head space. It is generally desired to emplace about 2–6 PJC generators in the head of an individual cylinder; hence, it is convenient to use a sparkplug-size device with a chamber volume of about 0.1 to 0.5 $in^3$, while the cross-section of the orifices may be of an order of 0.01 $in^2$. The totality of the prechamber volumes is between 3% and 10% of the head space volume in the cylinder with the piston at top dead center, and preferably about 5%. The parameters which are most conveniently adjusted are those that determine the amount of the reactants introduced into the chamber, i.e., (1) choice of the reactant and (2) reactant supply pressure and the time period of reactant introduction into the chamber.

It is also very important to introduce the fuel into the prechamber in the form of a fine spray, or preferably vapor, in order to obtain a readily ignitable intimately well combined mixture of fuel and air.

BRIEF DESCRIPTION OF THE DRAWINGS

The nature of the inventive subject matter and its advantages become more apparent upon consideration of the following description of the preferred embodiments which are illustrated in the following drawings, in which.

DESCRIPTION OF THE PREFERRED EMBODIMENTS

Figure 1:
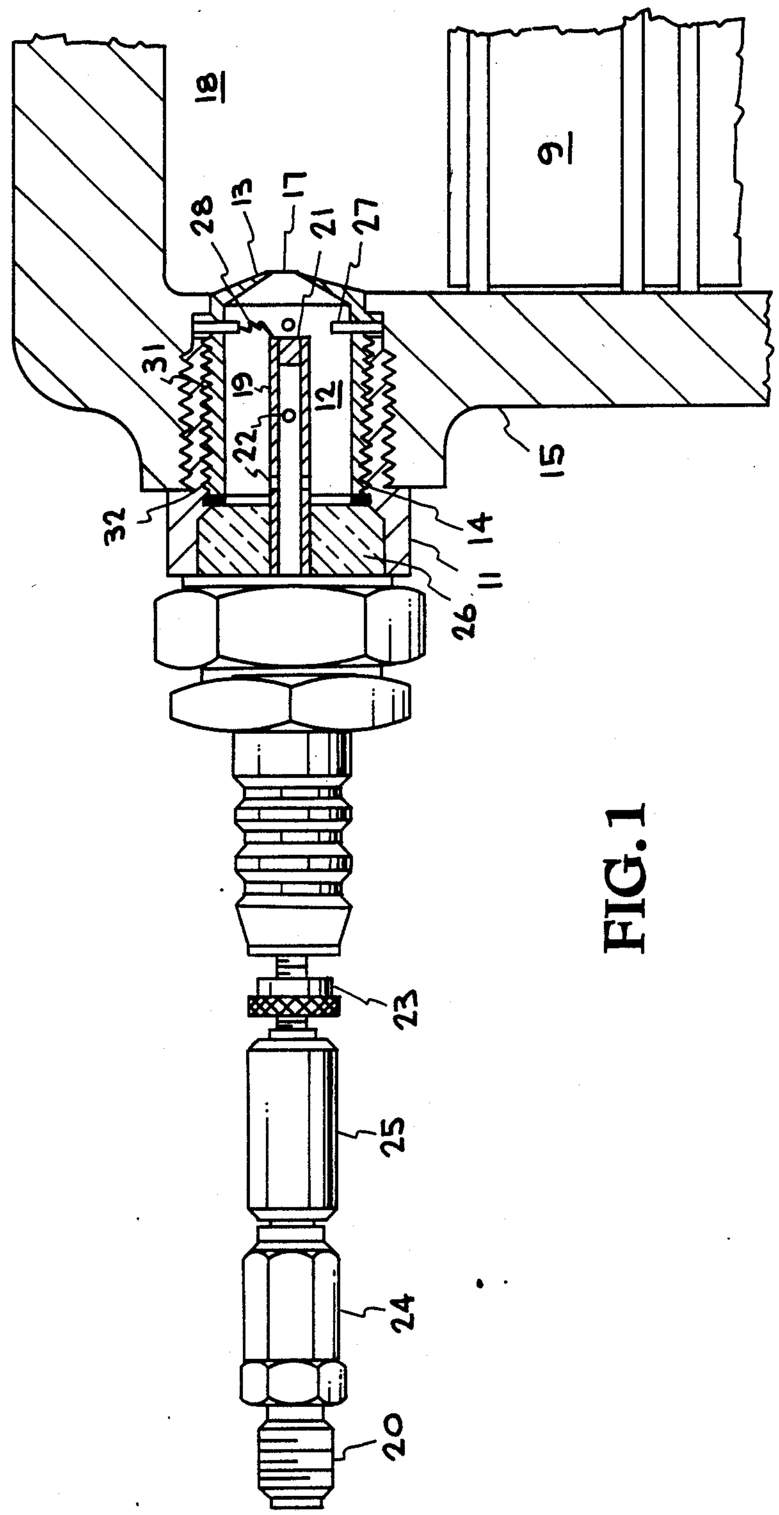
FIG. 1 shows an elevational, partially cutaway view of the present PJC generator.

FIG. 1 shows a preferred PJC generator with its pre-chamber presented in cross section. The main body 11 of the generator together with tip 13 defines the combustion chamber 12 in the interior thereof. The tip 13 is threaded into the bottom part of the generator body 11 and may be interchangeable with other tips of different configurations. The body is exteriorly threaded to permit emplacing the generator into a matching threaded access hole 14 through wall 15 in cylinder head 16. The tip 13 defines sharp edged orifices 17 directed into desired portions of the cylinder head space 18. Although only one orifice is shown, the tip section may have multiple orifices say anywhere between 1 and 5 as appropriate, filling an assigned region of the head space for proper control of the process of combustion. Generally the number of orifices is determined by the desired geometrical configuration of the plume. The depth of penetration is controlled by the cross-section area of the orifice. The orifices are generally sharp edged to minimize collisions of the non-equilibrium, active chemical species contained within the effluent stream of the combustion products, with the wall to prevent their recombination into stable inactive molecules. To ascertain proper large scale vortex structure of the plume, maximizing the entrainment of the external premixed charge into its interior, the opening of the orifices should be large enough (1 mm–3 mm in diameter) to assure subsonic efflux.

Reactants are introduced into chamber 12 by means of tube 19, which is connected to a source of reactant supply (not shown), through high pressure fitting 20. Typically, the reactants comprise a fuel liquid, or vapor phase such as gasoline or methanol, optionally premixed with air delivered from a separate supply system or extracted from the main fuel supply for the engine. The reactants are ejected from tube 19, closed at the bottom end 21, through an adequate number of spray perforations 22 around its periphery to enter the cavity 12 and mix with a portion of the main charge that has been forced in via orifices 17 in the course of the compression process due to piston motion towards the engine head. The preferred number and location of the perforations are dictated by the requirement for uniform distribution of the injected material in the medium filling initially the prechamber.

The hollow electrode may be used to introduce: fuel in liquid or gaseous form, a fuel-air mixture, or one of these plus some chemical additive that are either premixed in the supply reservoir or introduced in the supply line.

The extent to which working substance of the main charge enters the prechamber depends on the pressure differential between the prechamber and the head space during the compression stroke. As a consequence of the fact that oxygen is contained in the main charge, its amount forced into the prechamber may be sufficient for combustion. In this case air does not have to be supplied to the prechamber through the fuel tube. The reactant supply then provides only fuel. If, however, the amount of oxygen is insufficient, an adequate quantity of air is provided as necessary together with fuel to form the desired jets.

It should be observed that the PJC generator can provide service as an ignitor when it is operated without injecting fuel or a fuel/air mixture into its cavity. Its action then would be similar to that of a Bosch plug mentioned here earlier, relying entirely upon the portion of the charge pushed in from the head space through the ejector orifice, or orifices, as a consequence of compression by the piston. The charge may have to be for this purpose richer than in the normal operation of the engine. Such operating conditions are, in fact, existing at the start of the engine, the normal operation being thereupon gradually established, under microprocessor control, as the engine is warmed up and the fuel supply to the cavity of the generator reaches proper conditions while the charge is being diluted for optimum performance. It may also be important to keep the engine in running condition in the event of a failure of the PJC fuel supply system.

The fuel-air mixture contained in the prechamber is ignited by an electric discharge as in a conventional spark plug 28, through an electrode gap in chamber 12. Fuel tube 19 is electrically conductive to provide service as an electrode, and is for this purpose connected to a conventional supply of electrical power, such as a conventional ignition system (not shown) through terminal connector 23.

The reactant supply line is connected to the tubular electrode 19 by fitting 20. Check valve 24 assures that the reactants are admitted to the cavity when its internal pressure is relatively low, their amount being then controlled by the pressure in the supply line upstream of the check valve 24, but it blocks back flow when pressure in the cavity gets to be high. Check valve 24 may be passively mechanical, i.e. having its opening and closing action controlled by the relative magnitude of the pressure exerted by the fuel supply system and the variable pressure generated by the action of the piston on the one hand, and that of a mechanical spring on the other. Check valve 24 may also be an electro-mechanical valve, such as a solenoid activated valve. This valve opens and closes in response to electrical signals issued by a microprocessor in response to signals received from engine condition sensing instrumentation. Check valve 24 may also be a combination of the two, i.e. electronically controlled in one direction (supply) and mechanically in the other to prevent back flow. A nonconductive section 25, such as an electric wedgelock fitting, electrically insulates the generator assembly from the upstream fuel supply system. If the fuel supply lines are made of nonconductive materials, the section 25 is of course obviated. Insulator 26 similarly surrounds the fuel tube 19 and keeps it electrically insulated from the engine head 16.

An electric spark discharge 28 is caused to occur between the tip 21 of the fuel tube and electrodes 27 provided on the interior surface of the tip, which is in electrical conductive contact with the engine body.

The mixture in the chamber 12, is thus ignited and will generate a sufficiently high internal pressure to cause jets 29 to issue at an appropriate velocity through exit orifices 17, creating the required turbulent plumes in the compressed fuel/air mixture contained within the head space 18.

Figure 2:
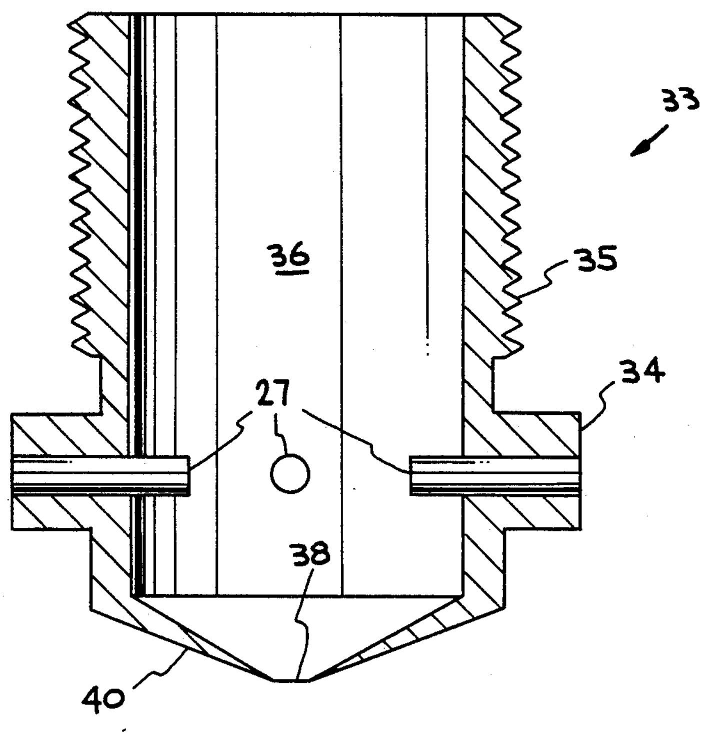
FIG. 2 shows a preferred interchangeable tip part in cross section.

FIG. 2 shows in cross section an exemplary tip part 33. It will be readily appreciated that tip parts of different configurations and different numbers and locations of orifices may be made and interchangeably threaded into the PJC generator body 11. The tip shown comprises a generally hollow cylindrical body 34 with an exterially threaded section 35 which fits into interior threads of the jet generator body 11. The combustion chamber volume is thus defined by the tip and the bottom of the insulator 26 in the generator plug. The tip shown exhibits one main central nozzle 38, made by lapping the conical apex of section 40. If desired, additional orifices may be made around the conical end section 40 at preferred locations. Electrodes 27 are in the form of pins pressed into the tip body to provide appropriately sized gaps between them and the end of the fuel tube.

Figure 3A:
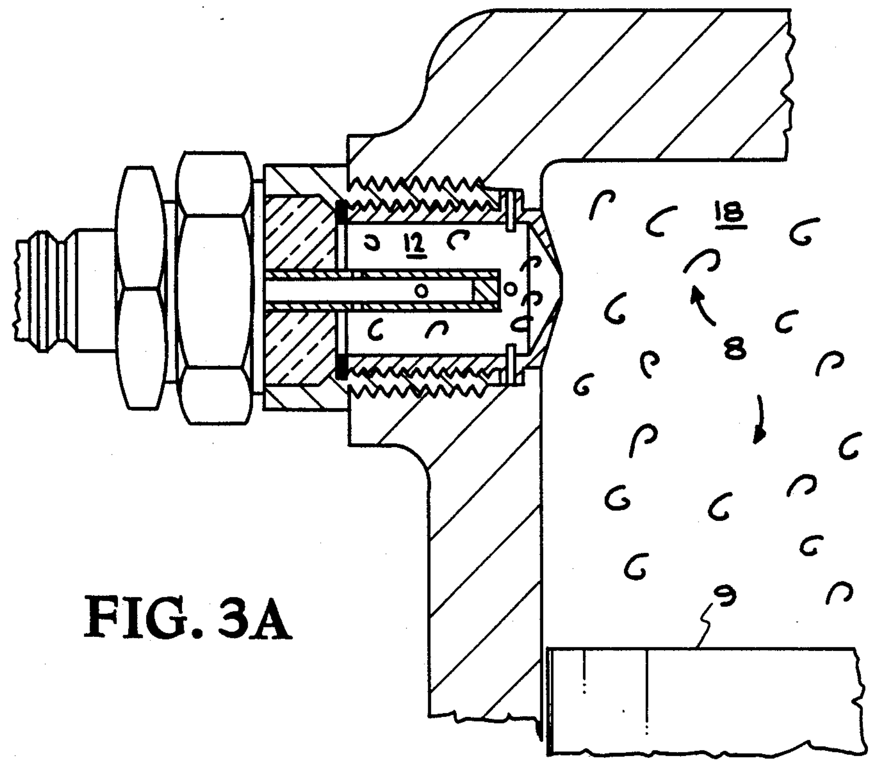
FIGS. 3*a* to 3*f* illustrate the operation of the present system for controlling combustion.
Figure 3B:
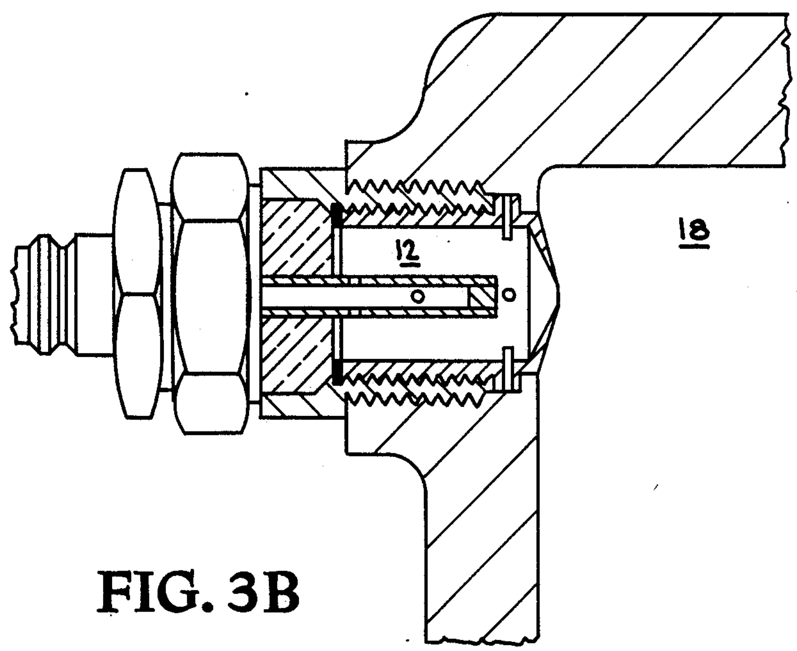
Figure 3C:
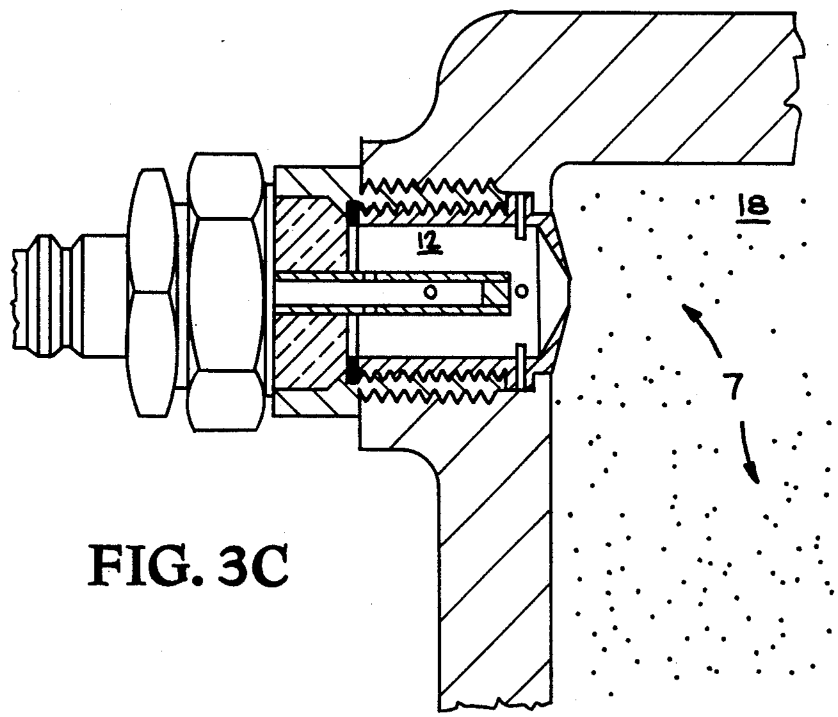
Figure 3D:
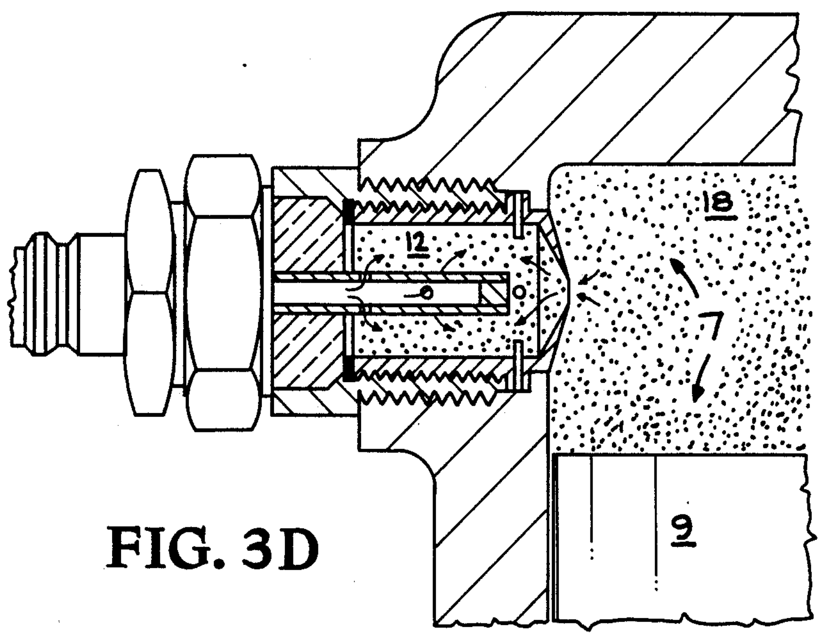
Figure 3E:
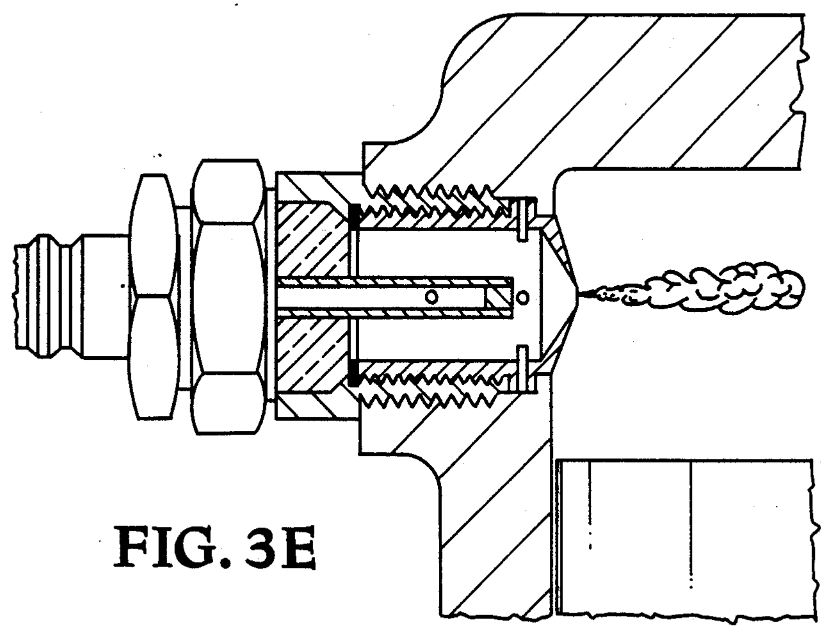
Figure 3F:
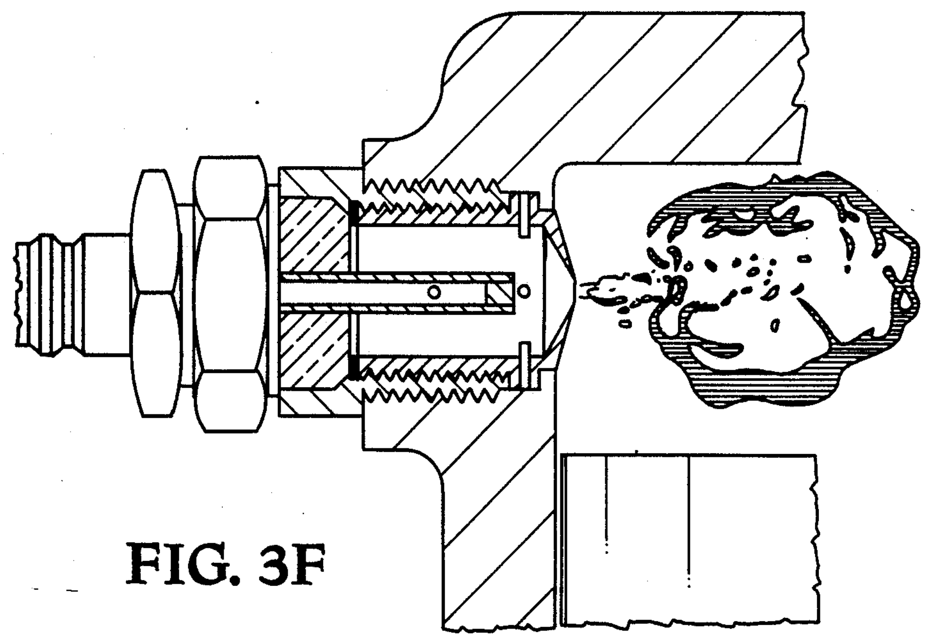

FIGS. 3*a*–3*e* show the present PJC generator in operation. FIG. 3*a* depicts the engine cylinder near the end of the power stroke with the head space 18 and prechamber volume 12 filled with combustion products while piston 9 travels downward. In FIG. 3*b* the combustion products have largely escaped while the cylinder is scavenged with fresh charge. FIG. 3*c* illustrates the beginning of the compression stroke, while the cylinder is filled with fresh charge 7. In FIG. 3*d* the charge 7 has been compressed by the upward travel of piston 9, and driven into the prechamber volume, while reactants are injected into the prechamber from the fuel supply tube. FIG. 3*e* shows the jet plume before combustion takes place. FIG. 3*f* shows the plume at its terminal stage, when combustion in its interior approached its end state.

It will be appreciated by those skilled in the art, that numerous changes and modifications may be made without departing from the spirit and scope of the present invention, whose scope should therefore be limited only by the following claims.

What is claimed is:

1. Apparatus for generating pulsed jets comprising combustion initiating high temperature combustion products containing an appreciable amount of active radicals, for injection into compressed premixed fuel-air charges of internal combustion engines during an appropriate time interval close to the end of the compression stroke, for initiating and controlling combustion of said compressed premixed fuel-air mixture, which comprises:

a body defining an interior chamber, said chamber including a terminal section defining at least one orifice for forming said jet, said body being capable of being secured to said internal combustion engine in fluid communication with the head space of a cylinder of said engine to direct said jet into said head space;

a hollow electrically conductive tube secured to said body in electrically insulated relationship thereto, one first end of said hollow electrode projecting into said interior chamber, said first end being closed and defining a plurality of spray perforations between the interior of said tube and said chamber, said hollow, electrically conductive tube having a second end capable of being connected to a supply of pressurized fuel in an electrically nonconductive relationship with said body, and said hollow, electrically conductive tube being capable of being connected to source of electrical energy sufficient to cause an electrical discharge across said chamber for ignition.

2. The apparatus of claim 1, wherein said terminal section of said chamber is a separate part, threaded into said body.

3. The apparatus of claim 1, wherein said terminal section includes a multiplicity of orifices aimed at predetermined regions within said head space.

4. The apparatus of claim 3, where said regions are adjacent.

5. The apparatus of claim 2, which includes a conductive insert means pressed into said part inside of it or through holes in its side walls to serve as ground electrodes for facilitating and defining a pathway for said electrical charge.

6. The apparatus of claim 1, wherein the chamber volume is between 0.1 to 0.5 in $^3$, while the orifices are 0.04 to 0.12 in diameter, and the sum of the cross sectional areas subtended by all of said orifices in a jet generator being of an order of 0.01 in$^2$.

7. The apparatus of claim 1, wherein said fuel is supplied as a fuel-air mixture.

8. The apparatus of claim 7, wherein said fuel is in vapor form.

9. The apparatus of claim 1, wherein said hollow, electrically conductive tube is insulated from said body by means of a tubular electrical insulator section in fuel supply line.

10. The apparatus of claim 1, further comprising an electrically operable valve disposed in the supply of pressurized fuel.

11. The apparatus of claim 1, further comprising microprocessor means and means responsible to electrical signals for controlling one or more of the following parameters: fuel pressure, time of delivery of fuel supply to said chamber fuel vapor-air equivalence ratio, and initiation of said electrical discharge.

12. The apparatus of claim 1, wherein said terminal section defines one or more sharp edged orifices.

* * * * *